Sept. 4, 1928.
R. E. B. WAKEFIELD
1,633,317
DEVICE FOR CONTROLLING THE FLOW OF FLUIDS
Filed Aug. 13, 1923
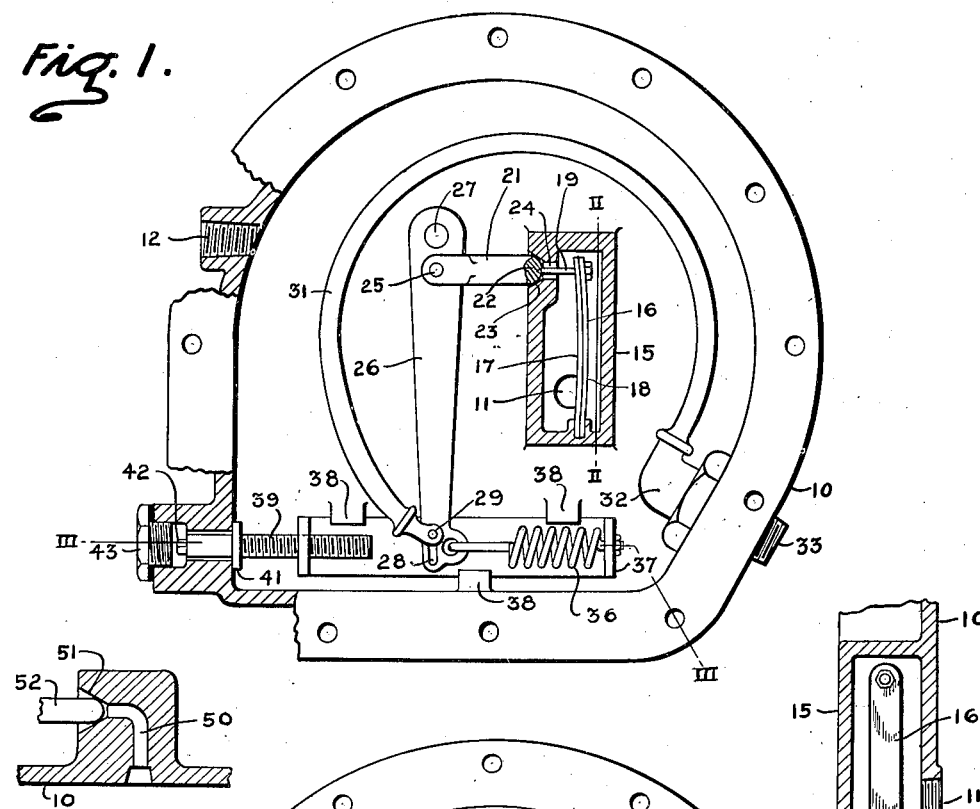
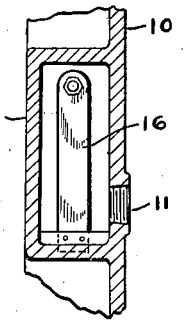
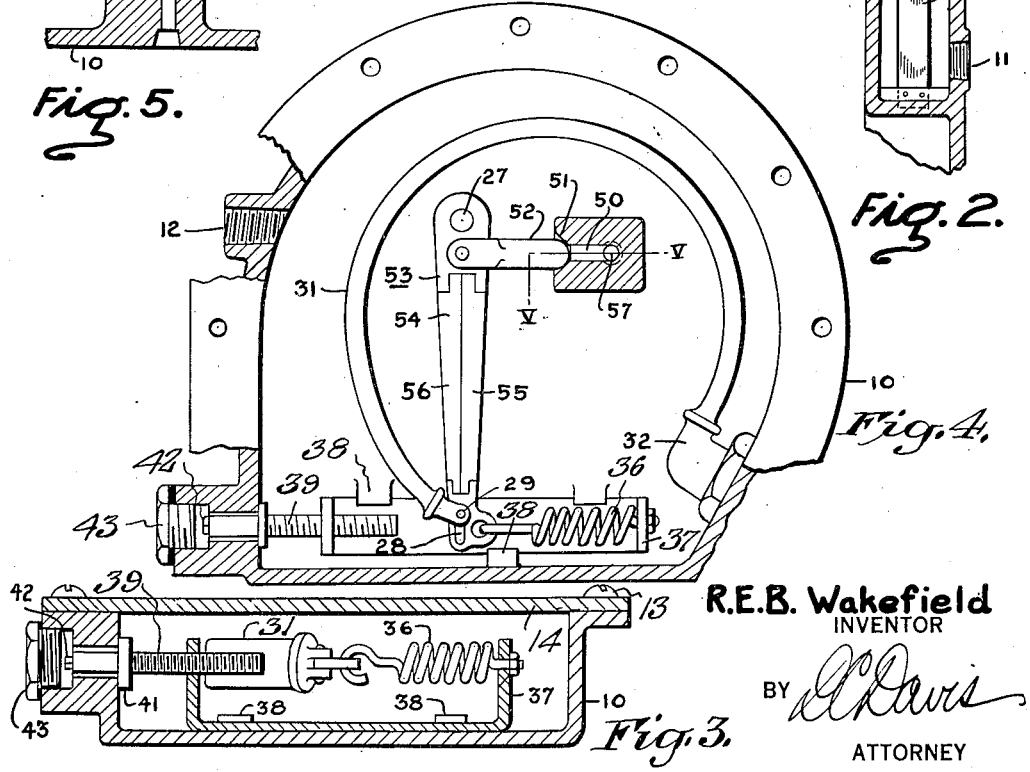
R.E.B. Wakefield
INVENTOR
BY *D. C. Davis*
ATTORNEY Patented Sept. 4, 1928.

1,683,317

UNITED STATES PATENT OFFICE.

RICHARD E. B. WAKEFIELD, OF CHESTER, PENNSYLVANIA, ASSIGNOR TO WESTING-HOUSE ELECTRIC AND MANUFACTURING COMPANY, A CORPORATION OF PENNSYLVANIA.

DEVICE FOR CONTROLLING THE FLOW OF FLUIDS.

Application filed August 13, 1923. Serial No. 657,267.

My invention relates to devices for controlling the flow of fluids in response to temperature and pressure conditions and it has for an object to provide apparatus of the character designated which shall be of simple and rugged construction and which shall exercise a very sensitive control over the flow of the fluid in response, not only to the variations in the pressure prevailing within an external controlling chamber, but also in response to variations in the temperature of the controlled fluid.

These and other objects, which will be made apparent throughout the further description of the invention, may be attained by the employment of apparatus hereinafter described and illustrated in the accompanying drawing in which Fig. 1 is a plan view of one form of my device shown with the cover plate removed; Fig. 2 is a partial sectional elevation taken on the line II—II of Fig. 1; Fig. 3 is a sectional elevation taken on the line III—III of Fig. 1; Fig. 4 is a fragmentary plan view of a preferred embodiment of my device which is also shown with the cover plate removed and Fig. 5 is a sectional elevation taken on the line V—V of Fig. 4.

In the construction of my device, I employ a Bourdon tube which actuates, through a bi-metallic lever, a valve located in the path of the fluid. The Bourdon tube is connected to the controlling medium, which may be any external source of pressure in accordance with which it is desired to control the flow of fluid, while the bi-metallic lever is immersed in the fluid. The valve is consequently actuated in response to the resultant movements of the tube and the link, which movements are directly responsive to alterations in the pressure of the controlling medium and to change in the temperature of the fluid.

Referring to the drawing for a more detailed description of my invention, I show in Fig. 1 a casing 10 provided with a fluid inlet passage 11 and a fluid outlet passage 12. Secured to the casing 10 by screws 13 is a removable cover plate 14. Associated with the inlet passage 11 and freely communicating therewith is a housing 15 within which is disposed a bi-metallic bar 16. The bi-metallic bar 16 is composed of materials having relatively different co-efficients of expansion such as, for example, steel and brass, the two materials being welded, rolled or otherwise rigidly joined together. In the apparatus illustrated, 17 represents that portion of the bar having the lesser co-efficient of expansion, while 18 represents that portion of the bar having the greater co-efficient of expansion. The bar is fixed within the housing 15 at one end while its opposite end is free to deflect in response to changes in the temperature of the fluid which enters the inlet passage 11. Secured to the free end of the bi-metallic bar 16 is a pin 19 which bears against a valve 21. Located in the housing 15 is a fluid passage 24 having provided therein a conical seat 23 which is adapted to engage the spherical face 22 of the valve 21. As illustrated, the bi-metallic bar 16 is arranged with an initial deflection, which causes the pin 19 to follow the valve 21 should the latter be removed from its seat. The valve 21 is pivotally connected at 25 to a connecting lever 26 which has its fulcrum point 27 pivotally connected to the casing 10. By the use of the lever 26, the force exerted by the Bourdon tube upon the valve 21 may be so increased as to produce a resultant force which is adapted, not only to counterbalance the initial contra-force exerted by the bi-metallic bar 16, but to insure a fluid-tight seating of the valve upon a predetermined reduction in pressure of the controlling medium.

The free end of the lever 26 is connected by means of a slotted hole 28 and a pin 29 to a Bourdon tube 31. The Bourdon tube 31 is anchored within the casing at its inlet end by means of a fitting 32 which communicates with a nozzle 33. The nozzle 33 may be connected to any source of pressure in response to which it is desired to control the flow of the fluid. A premature opening of the valve 21 is prevented by means of a spring 36 which is maintained under tension by the lever 26 and a bracket 37. The tension on the spring 36 may be varied by moving the bracket 37 between guides 38 as by a screw 39. The screw 39 is provided with a collar portion 41, which bears against the inner wall of the casing, and an extended portion 42 which is adapted to receive a key wrench. By rotating the screw 39, the tension upon the spring may be altered. A removable plug 43 forms a fluid-tight closure for the access opening provided in the casing for the screw 39.

Having thus described the arrangement of an apparatus embodying one form of my invention, the operation thereof is as follows: The fluid inlet 11 is connected with the source of supply and the fluid outlet 12 is connected with the apparatus to which it is desired to convey the fluid. As the fluid is to be supplied to the apparatus in response to various changes occurring in the pressure prevailing within a designated chamber, the nozzle 33 is connected to this chamber. Upon sufficient rise of pressure therein, the Bourdon tube 31 tends to straighten itself and incidentally remove the valve 21 from its seat 23.

Upon the movement of the valve 21 from its seat, the fluid flows from the housing 15 through the passage 24 into the casing 10, whereupon it flows through the outlet 12 to the apparatus. Should a slight reduction of pressure within the Bourdon tube occur, the valve acts to retard the amount of fluid flowing through the casing. Any increase in the temperature of the fluid itself increases the deflection of the bi-metallic bar 16 which increased deflection assists the Bourdon tube in moving the valve further from its seat. Should the temperature of the fluid decrease, however, the force exerted by the bi-metallic bar upon the valve is lessened, thereby permitting the spring 36 to reduce the area of flow through the valve. Upon a designated reduction in the pressure prevailing within the controlling chamber, and in the temperature of the fluid, the Bourdon tube 31 moves to close the valve, thereby shutting off the supply of fluid to the apparatus.

In Figs. 4 and 5, I show a preferred form of my apparatus which is similar to that illustrated and described in relation to Figs. 1, 2 and 3 with the exception that the bi-metallic bar and the lever for transmitting motion from the Bourdon tube to the valve are combined in a single element. As shown, the fluid enters the casing 10 through an inlet passage 50 which is provided with a conical valve seat 51. Associated with the valve seat 51 is a valve 52 which is actuated by a lever 53 and the Bourdon tube 31. The lever 53 has a bi-metallic portion 54 composed of materials having relatively different co-efficients of expansion. The material having the lesser co-efficient of expansion is represented at 56, while the material having the greater co-efficient of expansion is represented at 55.

The operation of this embodiment of my device is as follows: Upon accumulation of a predetermined pressure within the Bourdon tube 31, there is a tendency for it to straighten itself and it consequently removes the valve 52 from its seat 51. This permits the fluid to flow through the inlet passage 50 and fill the casing 10, whereupon it flows through the outlet 12 to the apparatus. Upon the casing 10 becoming filled with the fluid, the bi-metallic portion 54 of the lever 53 assumes a temperature substantially equal thereto. Any increase in the temperature of the fluid results in an increase in the deflection of the lever and a further opening of the valve 52, while any reduction in the temperature of the fluid produces an opposite effect, thereby closing the valve. The movements of the valve 52 are consequently controlled by the resultant movements of both the Bourdon tube and the bi-metallic lever, the tube being responsive to changes in the pressure of the controlling medium while the bi-metallic lever is responsive to changes in the temperature of the fluid, the flow of which it is desired to control.

Apparatus of the character described herein is especially adapted for use in connection with compression refrigerators of the household type which employ water as a condensing medium, and in which my apparatus may be employed to control the flow of the water through the condensing coils in response to the pressure prevailing within the condensing chamber and in response to variations in the temperature of the water. As the amount of water employed is rather an important item in the operating costs of apparatus of this type, very careful flow regulation is desirable. I have found, that with the use of the apparatus heretofore described, very sensitive regulation of the amount of water entering the refrigerator may be obtained, the Bourdon tube controlling the supply in response to variations in the pressure prevailing within the condensing chamber, while the bi-metallic bar controls the supply in response to variations in the temperature of the cooling water. As the arrangement is usually such that the cooling water passes through the control device prior to its entrance into the condensing chamber of the refrigerator, a very fine heat balance may always be maintained therein, resulting in a uniform and highly efficient performance of the apparatus.

While I have shown my invention in but two forms, it will be obvious to those skilled in the art, that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a device for controlling the flow of a fluid, the combination of a flexible conduit subject to the pressure of a controlling medium, a bi-metallic bar subject to the temperature of the fluid, and means for controlling the flow of said fluid in response to the flexing of both the conduit and the bar.

2. In a device for controlling the flow of a fluid, the combination of a casing, a valve for controlling the flow of the fluid through the casing, a bi-metallic bar responsive to the temperature of the fluid, a Bourdon tube responsive to the pressure of a controlling medium and operatively connected to the bi-metallic bar, and means for transmitting the resultant movements caused by the flexing of the bar and the tube to the valve, whereby the movements of the valve are responsive to both the pressure of the controlling medium and to the temperature of the fluid.

3. In a device for controlling the flow of fluids, the combination of a casing having fluid inlet and outlet means, valve means provided within the casing for controlling the flow of the fluid therethrough, a conduit yieldable to an external source of pressure fixed within the casing at its inlet end, and a bi-metallic bar immersed in the fluid and connecting the free end of the conduit to the valve means, whereby said valve means is actuated in response to the combined movements of the conduit and the bi-metallic bar.

4. In a device for controlling the flow of fluids, the combination of a casing having fluid inlet and outlet ports, a valve for controlling the flow of the fluid through the casing, a Bourdon tube having its inlet end fixed within the casing, said Bourdon tube being adapted to be connected to an external source of pressure, and a link mechanism including a bi-metallic portion for transmitting the movements of the free end of the Bourdon tube to the valve, said link mechanism being adapted to alter the extent of the movement transmitted from the Bourdon tube to the valve.

5. In a device for controlling the flow of fluids, the combination of a casing having fluid inlet and outlet ports, a valve for controlling the flow of fluid through the casing, a Bourdon tube having its inlet end fixed within the casing and adapted to be connected to an external source of pressure, a link mechanism including a bi-metallic portion for transmitting the movements of the Bourdon tube to the valve, said bi-metallic portion of the link mechanism being subject to the temperature of the fluid, and resilient means secured to the free end of the Bourdon tube and to an adjustable abutment for altering the amount of pressure and the temperature required to actuate the valve.

6. In a device for controlling the flow of a fluid, the combination of a casing, a valve for controlling the flow of the fluid through the casing, a bi-metallic bar mounted for movement within the casing, a bent tube having a closed end and adapted to be connected to a source of pressure, and means for controlling said valve by the resultant force exerted by said tube and said bar.

7. In a device for controlling the flow of a fluid, the combination of a casing, a valve for controlling the flow of the fluid through the casing, a bi-metallic lever extending within the casing and mounted thereon, a bent tube having a closed end and adapted to be connected to a source of pressure, and means for actuating said valve by the resultant force exerted by said tube and said lever.

8. In a device for controlling the flow of a fluid, the combination of a casing, a valve for controlling the flow of fluid through the casing, a bi-metallic bar pivotally mounted on said casing, a bent tube having a closed end and adapted to be connected to a source of pressure, a portion of said bar being within a projection of the area included by said bent tube, and means for actuating said valve by the resultant force exerted by said bent tube and said bi-metallic bar.

In testimony whereof, I have hereunto subscribed my name this 31st day of July 1923.

RICHARD E. B. WAKEFIELD.